(12) United States Patent
Park

(10) Patent No.: US 8,437,930 B2
(45) Date of Patent: May 7, 2013

(54) METHOD FOR CONTROLLING TCU FAIL-SAFE USING ELECTRONIC SHIFT LEVER

(75) Inventor: Hangil Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 269 days.

(21) Appl. No.: 12/877,717

(22) Filed: Sep. 8, 2010

(65) Prior Publication Data
US 2011/0137533 A1 Jun. 9, 2011

(30) Foreign Application Priority Data
Dec. 4, 2009 (KR) .................. 10-2009-0119578

(51) Int. Cl.
*G06F 7/00* (2006.01)
(52) U.S. Cl.
USPC ............................................................ 701/62
(58) Field of Classification Search .............. 701/62; 180/165; 477/96, 175; 192/219.6
See application file for complete search history.

(56) References Cited

U.S. PATENT DOCUMENTS

| | | | | |
|---|---|---|---|---|
| 5,492,192 A * | 2/1996 | Brooks et al. | ................. | 180/165 |
| 6,125,983 A * | 10/2000 | Reed et al. | ................. | 192/219.5 |
| 6,182,002 B1 * | 1/2001 | Bauerle et al. | ................... | 701/82 |
| 6,332,257 B1 * | 12/2001 | Reed et al. | ..................... | 29/401.1 |
| 6,527,670 B1 * | 3/2003 | Gierer et al. | ...................... | 477/94 |
| 7,743,901 B2 * | 6/2010 | Hayashi et al. | ............ | 192/219.6 |
| 2004/0138027 A1 * | 7/2004 | Rustige et al. | ................ | 477/175 |
| 2005/0143220 A1 * | 6/2005 | Berger et al. | .................... | 477/96 |
| 2010/0274454 A1 * | 10/2010 | Nishimura et al. | ............. | 701/54 |
| 2011/0137532 A1 * | 6/2011 | Park | .............................. | 701/58 |
| 2011/0137533 A1 * | 6/2011 | Park | .............................. | 701/62 |
| 2012/0138394 A1 * | 6/2012 | Park et al. | ................ | 188/1.11 E |

FOREIGN PATENT DOCUMENTS

| | | |
|---|---|---|
| JP | 2007-238000 A | 9/2007 |
| JP | 2009-275818 A | 11/2009 |
| KR | 10-020098 B1 | 3/1999 |

* cited by examiner

*Primary Examiner* — Thomas Black
*Assistant Examiner* — Tyler Paige
(74) *Attorney, Agent, or Firm* — Morgan, Lewis & Bockius LLP

(57) ABSTRACT

The present invention relates to a method for controlling a TCU fail-safe using an electronic shift lever. A failure state of TCU is verified through CAN BUS (serial communication, or hardware wire) using an electronic shift lever unit, and a parking sprag is forcibly unlocked from a parking gear by pulling an override cable for parking by the an electronic shift lever unit when TCU being in the failure state, so that the implementation of fail-safe according to a failure of TCU is accomplished with higher control stability than using a transmission and without an addition of a component or a change of design.

7 Claims, 3 Drawing Sheets

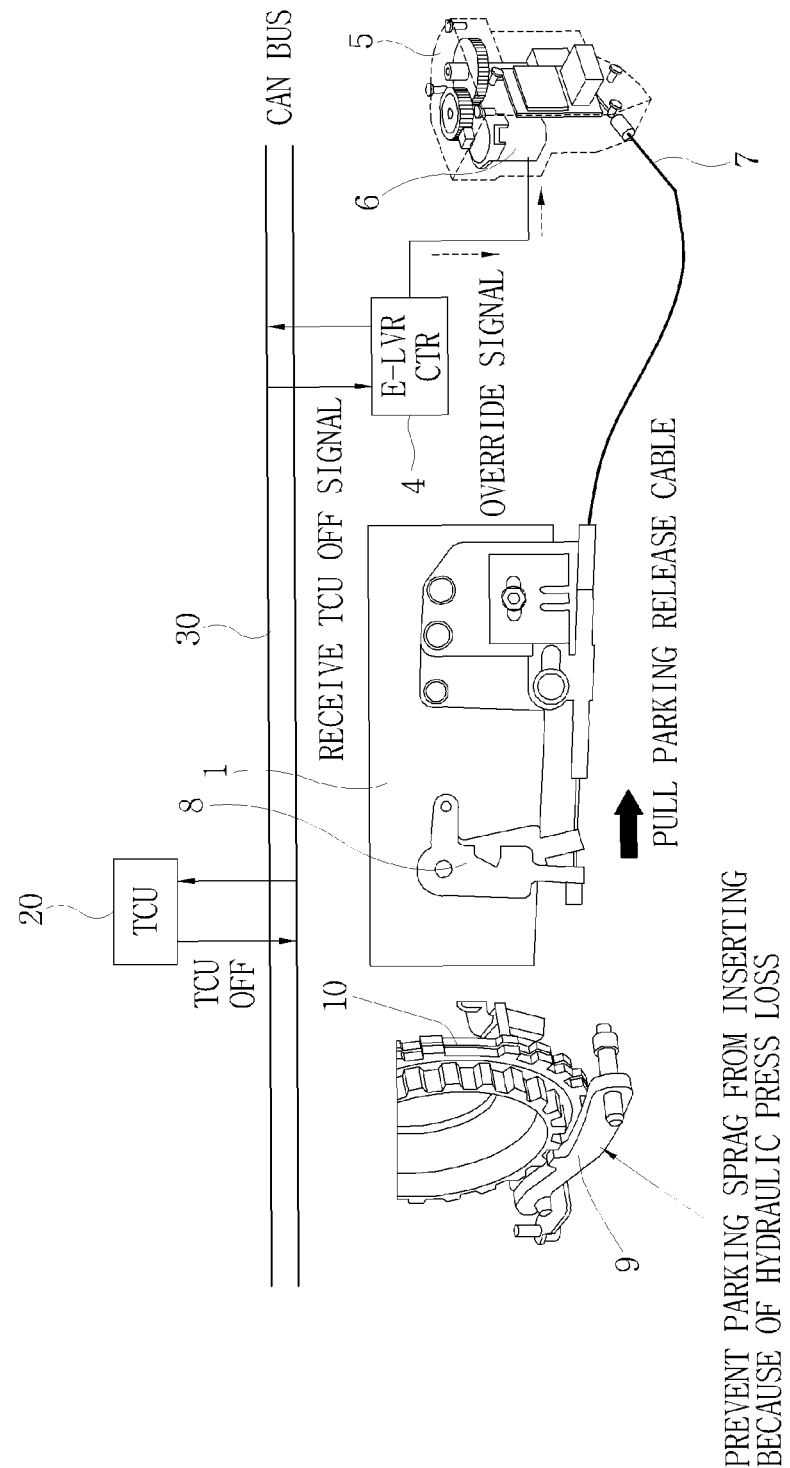

METHOD FOR CONTROLLING TCU FAIL-SAFE USING ELECTRONIC SHIFT LEVER

CROSS-REFERENCE TO RELATED APPLICATIONS

The present application claims priority to Korean Patent Application Number 10-2009-0119578 filed Dec. 4, 2009, the entire contents of which application is incorporated herein for all purposes by this reference.

BACKGROUND OF THE INVENTION

1. Field of the Invention

The present invention relates to a TCU fail-safe, more particularly to a method for controlling a TCU fail-safe using an electronic shift lever unit.

2. Description of Related Art

Generally, SBW being shift by wire for a vehicle is a shifting system that is free from a mechanical coupling structure between a transmission and a shift lever by electronically realizing using an actuator, an electronic shift lever unit and a controller (or ECU).

Vehicles equipped with an electronic shift lever unit such as SBW (shift by wire) have to implement a fail-safe.

The fail-safe as mentioned above, for example, has a function of forcibly releasing a parking insertion of a parking sprag when a failure of TCU leading to solenoid hydraulic pressure loss in a transmission is occurred.

Usually, the way of implementing using a transmission applies to the function as mentioned above.

However, the function of the fail-safe according to a failure of TCU is implemented in the transmission, thereby being forced to somewhat have an unstable aspect that may make unexpected condition due to a transmission itself state.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method for controlling a TCU fail-safe using an electronic shift lever unit, wherein a parking insertion is forcibly released by pulling an override cable lead to a transmission with the electronic shift lever unit when TCU being in the failure state, so that the implementation of fail-safe according to a failure of TCU can be accomplished without rising costs or a change of design due to an addition of a component.

In an aspect of the present invention, the method for controlling a TCU (Transmission Control Unit) fail-safe using an electronic shift lever unit, may include a) carrying out communication between a TCU controlling a transmission and the electronic shift lever unit, b) verifying whether the TCU may be in a first failure state or not according to the communication, c) driving a motor of a parking power machine in order to pull an override cable connected to a parking sprag locked in a parking gear of the transmission to unlock the parking sprag from the parking gear, when the electronic shift lever unit determines that the TCU may be in the first failure state after the communication therebetween, d) verifying by using the electronic shift lever unit whether the TCU may be in a second failure state, after the override cable may be pulled, e) checking a speed of a vehicle by using the electronic shift lever unit, when the TCU may be verified to be in the second failure state, and f) informing a driver of being over a predetermined speed by using the electronic shift lever unit, when the speed of the vehicle may be over the predetermined speed.

The method may further include implementing a parking state after the step f) when the vehicle slows down below the predetermined speed or stops.

The communication between the TCU and the electronic shift lever unit may be performed through CAN BUS, serial communication, or hardware wire.

When the TCU may be verified to be normal after the override cable may be pulled at the step d), the electronic shift lever unit controls the motor so as to release the pulling of the override cable.

The predetermined speed of the vehicle may be approximately below 5 KPH or stop state.

The informing driver may be a type of showing a character.

The informing of the driver may be a showing of a current driving condition or an induction to a driving condition in the vehicle.

The present invention makes it possible to implement fail-safe according to a failure of TCU without rising costs or a change of design due to an addition of a component, by pulling an override cable lead to a transmission side using the electronic shift lever unit when TCU being in the failure state.

Also, the present invention makes it possible to implement rapid and accurate fail-safe using control logic for verifying a failure state of TCU through CAN BUS(serial communication, or hardware wire), and to provide higher control stability than using a transmission.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is a view showing an operation for parking shift prevention when a control of TCU fail-safe being implemented using an electronic shift lever unit according to an exemplary embodiment of the present invention.

Figure 1:
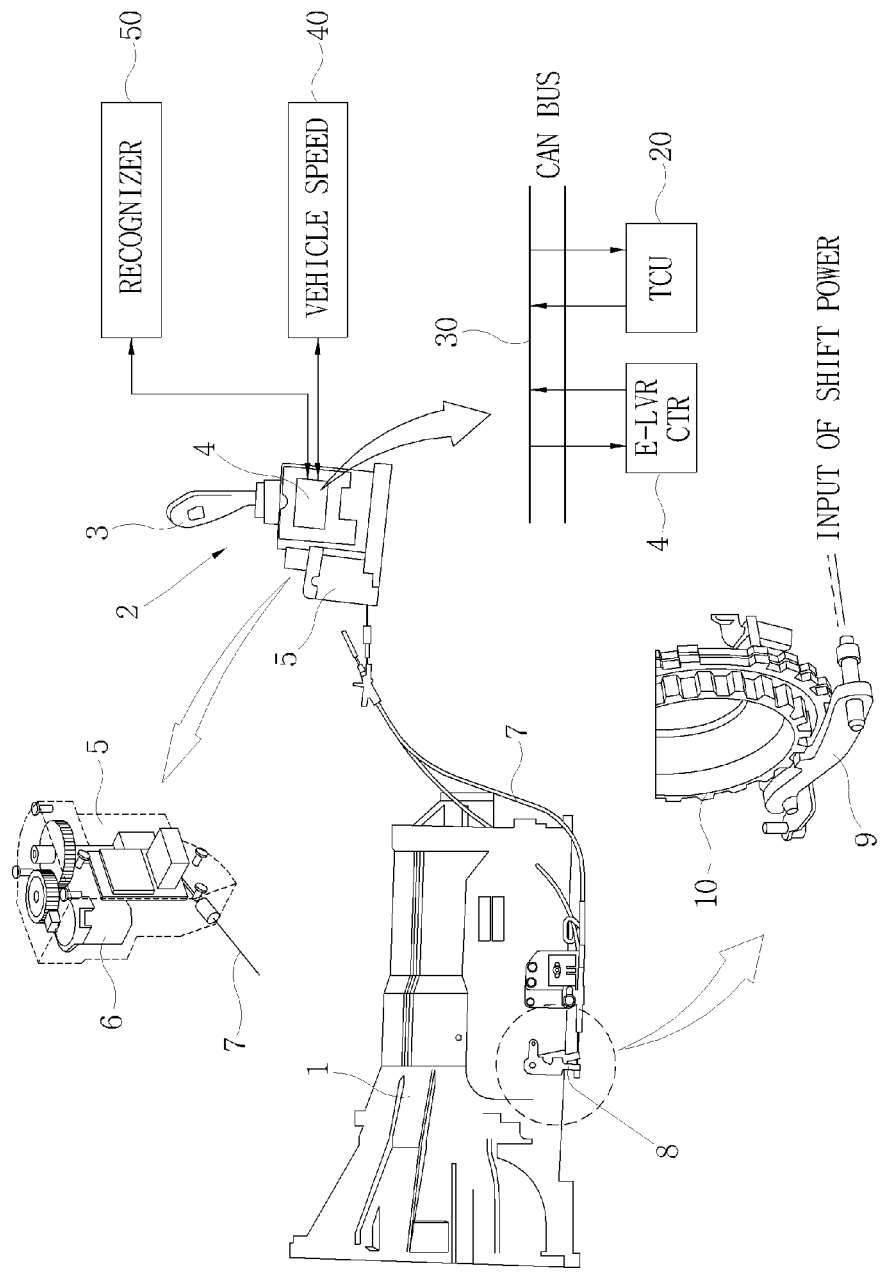
FIG. 1 is a view illustrating a structure of a TCU fail-safe device using an electronic shift lever unit according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

FIG. 1 is a view illustrating a structure of a TCU fail-safe device using an electronic shift lever unit according to an exemplary embodiment of the present invention.

As shown, the present invention, in an exemplary embodiment, includes a transmission 1 controlled by a TCU 20, an electronic shift lever unit 2 having a lever controller 4 controlling a shift lever 3 and a parking power machine 5 having a motor 6, an override cable 7 connected from parking power machine 5 to a transmission control lever 8 of transmission 1, and a parking sprag 9 pulled by override cable 7 and unlocked from a parking gear 10 in transmission 1.

A shift cable is connected to transmission 1, which is connected from electronic shift lever unit 2 to transmission control lever 8.

In the embodiment, lever controller 4 in electronic shift lever unit 2 is connected to a communication line 30 and communicates with TCU 20, thereby verifying a failure state of TCU 20.

Communication line 30 uses a CAN BUS, a serial communication, or a hardware wire.

Lever controller 4 checks a speed of a vehicle through a information obtained from a vehicle speed supplier 40 and has a recognizer 50 providing a information to have a driver know a failure state of TCU 20.

Vehicle speed supplier 40 may be a speed sensor or an ECU controlling a vehicle, recognizer 50 may be a winker or an LED.

In the embodiment, lever controller 4 may be a separate CPU controlling shift lever 3 or an ECU controlling a vehicle.

As described above, the embodiment uses electronic shift lever unit 2, and also uses existing elements such as override cable 7 for parking connected to parking sprag 9 locked in parking gear 10, thereby doing not cause rising costs or a change of design due to an addition of a component.

Figure 2:
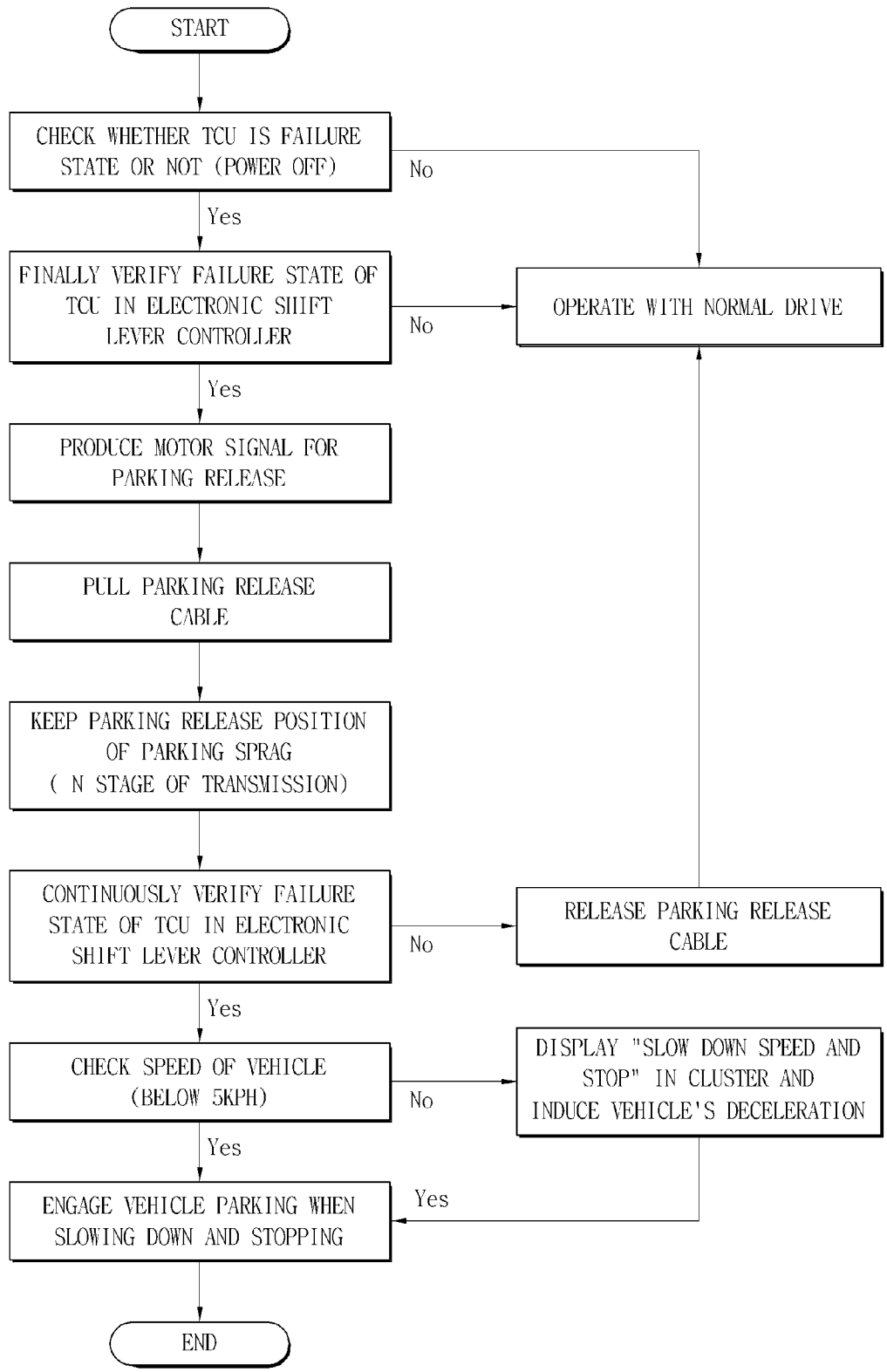
FIG. 2 is a flowchart showing a method for controlling a TCU fail-safe using an electronic shift lever unit according to an exemplary embodiment of the present invention.

FIG. 2 is a flowchart showing a method for controlling a TCU fail-safe using an electronic shift lever unit according to the embodiment.

As shown, in the embodiment, electronic shift lever unit 2 communicates with TCU 20 through communication line 30 such as a CAN BUS (a serial communication, or a hardware wire), thereby verifying a failure state of TCU 20 rapidly.

Communication with TCU 20 through a CAN BUS (a serial communication, or a hardware wire) is carrying out by lever controller 4.

If it is verified that TCU 20 normally operates through CAN BUS (serial communication, or hardware wire) communication, it is judged that a driving condition is normal. However, if it is verified that TCU 20 is in a failure state, a forcible release of a parking insertion is implemented.

As described above, electronic shift lever unit 2 verifies and controls a failure of TCU 20 through CAN BUS (serial communication, or hardware wire) rapidly, thereby providing higher control stability than using a transmission.

In the embodiment, when a failure state of TCU 20 is verified using lever controller 4 in electronic shift lever unit 2, lever controller 4 transmits a signal to a motor of parking power machine 5 so as to pull override cable 7.

FIG. 3 is a view showing an operation for parking shift prevention when a control of TCU fail-safe being implemented using an electronic shift lever unit according to the embodiment.

When TCU 20 is in a failure state, a hydraulic pressure in transmission 1 is reduced and parking sprag 9 locks in parking gear 10, so that parking sprag 9 has to be forcibly released from parking gear 10.

As shown, in the embodiment, motor 6 receiving a signal pulls override cable 7, thereby being forced to unlock parking sprag 9 which is provided in transmission control lever 8 and locked in parking gear 10.

That is, the pulled override cable 7 forcibly pulls parking sprag 9 provided in transmission control lever 8, and the forcibly pulled parking sprag 9 cannot lock in parking gear 10, so that it is implemented that a parking insertion forcibly is released.

A neutral N condition of a transmission is a position in which parking insertion of parking sprag 9 is released.

In the embodiment, as described above, a failure state of TCU 10 is repeatedly verified through lever controller 4 in electronic shift lever unit 2, after override cable 7 is pulled.

After being repeatedly verified, if TCU 20 is in a normal state, lever controller 4 sends a release signal to motor 6 of parking power machine 5 and override cable 7 is not pulled. However, after being repeatedly verified, if TCU 20 remain in a failure state, a current speed of a vehicle is checked through information obtained from vehicle speed supplier 40.

If the checked current speed of a vehicle is over a certain speed, it is informed a driver of being over a certain speed and induced to slow down. Otherwise, nothing is informed to a driver separately.

More than about 5 KPH is a speed of a vehicle of which is informed a driver and induced to slow down, and below 5 KPH or stop state is a speed of a vehicle of which is not informed a driver separately.

If the vehicle drives in below a certain speed or stops after being receiving warning with respect to a vehicle speed, the vehicle implements a parking state in usual parking operation without a separate control through electronic shift lever unit 2.

In the embodiment, as described above, a failure state of TCU is verified through CAN BUS (serial communication, or hardware wire) using electronic shift lever unit 2, and a parking sprag 9 is forcibly unlocked from parking gear 10 by pulling override cable 7 for parking by electronic shift lever unit 2 when TCU being in the failure state, so that the function of fail-safe according to a failure of TCU is implemented without an addition of a separate component or a change of design.

Also, in the embodiment, electronic shift lever unit 2 carries out the function of fail-safe according to a failure of TCU, thereby having higher control stability than using a transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a TCU (Transmission Control Unit) fail-safe using an electronic shift lever unit, comprising:
   a) carrying out communication between a TCU controlling a transmission and the electronic shift lever unit;
   b) verifying whether the TCU is in a first failure state or not according to the communication;
   c) driving a motor of a parking power machine in order to pull an override cable connected to a parking sprag locked in a parking gear of the transmission to unlock the parking sprag from the parking gear, when the electronic shift lever unit determines that the TCU is in the first failure state after the communication therebetween;
   d) verifying by using the electronic shift lever unit whether the TCU is in a second failure state, after the override cable is pulled;
   e) checking a speed of a vehicle by using the electronic shift lever unit connected to a vehicle speed supplier, when the TCU is verified to be in the second failure state; and
   f) informing a driver of a failure state of TCU by using the electronic shift lever unit, when the speed of the vehicle is over the predetermined speed.

2. The method as defined in claim 1, further comprising implementing a parking state after the step f) when the vehicle slows down below the predetermined speed or stops.

3. The method as defined in claim 1, wherein the communication between the TCU and the electronic shift lever unit is performed through CAN BUS, serial communication, or hardware wire.

4. The method as defined in claim 1, wherein when the TCU is verified to be normal after the override cable is pulled at the step d), the electronic shift lever unit controls the motor so as to release the pulling of the override cable.

5. The method as defined in claim 1, wherein the predetermined speed of the vehicle is approximately below 5 KPH or stop state.

6. The method as defined in claim 1, wherein the informing of the driver is a type of showing a character and a recognizer is connected to the electronic shift lever unit to provide the character.

7. The method as defined in claim 1, wherein the informing of the driver is a showing of a current driving condition in the vehicle.

* * * * *